United States Patent
Gravier

(10) Patent No.: US 7,198,275 B2
(45) Date of Patent: Apr. 3, 2007

(54) SEALING AND REPLENISHMENT GASKET

(75) Inventor: Stephane Gravier, Lyons (FR)

(73) Assignee: Freudenberg, Macon (FR)

( * ) Notice: Subject to any disclaimer, the term of this patent is extended or adjusted under 35 U.S.C. 154(b) by 0 days.

(21) Appl. No.: 10/806,462

(22) Filed: Mar. 23, 2004

(65) Prior Publication Data

US 2004/0245726 A1  Dec. 9, 2004

(30) Foreign Application Priority Data

Mar. 24, 2003  (FR) .................................. 03 03533

(51) Int. Cl.
*F16J 9/00*   (2006.01)
*F16J 15/32*  (2006.01)

(52) U.S. Cl. ................ 277/438; 277/439; 277/567; 277/928; 277/560

(58) Field of Classification Search ............... 277/436, 277/438, 530, 567, 560, 439, 928
See application file for complete search history.

(56) References Cited

U.S. PATENT DOCUMENTS

| 869,536 | A | * | 10/1907 | Weber | 277/512 |
| 3,519,280 | A | * | 7/1970 | Genz | 277/438 |
| 3,563,558 | A | * | 2/1971 | Doutt | 277/438 |
| 3,851,888 | A | * | 12/1974 | Limpson et al. | 277/436 |
| 4,434,909 | A | * | 3/1984 | Ott | 220/316 |
| 5,169,160 | A | * | 12/1992 | Gaskill et al. | 277/438 |
| 5,328,178 | A | | 7/1994 | Nies | |
| 5,556,112 | A | * | 9/1996 | Brandt | 277/560 |
| 5,575,484 | A | | 11/1996 | Burke | |
| 6,877,633 | B2 | * | 4/2005 | Niese | 220/315 |

FOREIGN PATENT DOCUMENTS

FR  343194  1/1960

* cited by examiner

*Primary Examiner*—Alison K. Pickard
(74) *Attorney, Agent, or Firm*—Clark & Brody

(57) ABSTRACT

The annular sealing cup with axis Δ, a so-called replenishment cup, which is intended to be positioned between a hydraulic cylinder and piston and which has a <<U>> axial section and has application to braking circuits comprises:
  a static branch (10) defining a static sealing annular lip,
  a dynamic branch (12) defining a dynamic sealing annular lip,
  and a core (14) connecting the static (10) and dynamic (12) branches and defining a annular bead (15) opposite the lips.

According to the invention, the cup is characterized in that the connecting surface (24) between the static branch (10) and the core (14), located opposite the bead (15), has a concave shape corresponding to a local reduction in the thicknesses of the static branch (10) and of the core (14) at the connecting region between the static lip and the core (14), so as to define a rotation area (21).

14 Claims, 2 Drawing Sheets

SEALING AND REPLENISHMENT GASKET

FIELD OF INVENTION

The present invention relates to the technical field of sealing gaskets intended to be fitted between two parts able to move relatively to one another.

BACKGROUND OF THE INVENTION

In a preferred application, the invention relates to sealing gaskets or cups intended to be interposed between two coaxial parts, such as, for example, a cylinder and a piston of a brake control hydraulic system.

Within the scope of such an application, in a brake control system, the implementation of a sealing cup is known, for example, which provides a dual function, i.e., a sealing function enabling both chambers located on either side of the cup gasket to be isolated on the one hand and, on the other hand a back flow stop valve function enabling a slight leak, a so-called replenishing leak, from one chamber to the other but on the contrary, preventing any flow in the opposite direction when the system must exert a braking pressure.

For this purpose, the annular cup gasket has an axial <<U>> section which comprises a static sealing annular lip, a dynamic branch defining a dynamic sealing annular lip and a core connecting the static and dynamic branches and defining a bead opposite the lip.

The annular sealing cups, the so-called replenishing cups, according to the prior art generally have a uniform thickness and if they provide their dual function of isolation in one direction and of a back flow stop valve in another direction of operation, they however have the drawbacks of not having a large sensitivity to replenishment on the one hand, so that the pressure difference between both chambers is required to be relatively large in order to lift the dynamic lip and provide this replenishment, and on the other hand, of not having an optimum resistance to wear and tear, and notably to the extrusion phenomenon which may occurring during use and more particularly, at the end of the braking system's life, so that the cups according to the prior art are able to free particles which may change the operation of the system.

BRIEF SUMMARY OF THE INVENTION

Thus, the need arises for a new type of replenishing cup which has both a larger sensitivity to filling, i.e., not requiring a large pressure difference between the upstream and down-stream chambers of the cup, while providing a higher resistance to the extrusion phenomenon than the sealing cups according to the prior art. The invention is also directed to providing a replenishment cup having these sensitivity and resistance properties while having reduced bulkiness.

In order to achieve these objects, the invention is related to an annular sealing cup with axis $\Delta$, a so-called replenishment cup, which is intended to be positioned between a cylinder and a hydraulic piston and which has a <<U>> axial section comprising:

a static branch defining a static sealing lip,
a dynamic branch defining a dynamic sealing lip,
and a core connecting the static and dynamic branches and defining an annular bead opposite the lips.

According to the invention, this so-called replenishment cup is characterized in that the connecting surface, between the static branch and the core, located opposite the bead, has a concave shape corresponding to a local reduction in the thicknesses of the static branch and the core at the connecting region, between the static lip and the core, so as to define a bending area.

In order to achieve optimum flexibility, the minimum thickness of the static branch in the bending area, preferably, but not exclusively, is between 60% and 85% of the maximum thickness of the static branch, and more preferably, between 65% and 80%.

According to another feature of the invention, in order to provide good stability of the static sealing lip during movements of the dynamic sealing lip, the internal and external faces of the static sealing lip preferably, but not necessarily, are substantially parallel outside the bending area.

According to another feature of the invention, in order to obtain correct stressing of the static lip upon mounting the cup in its housing, between the piston and the cylinder, the internal and external faces of the static lip, preferably but not exclusively, form with axis $\Delta$, an angle between 0° and 10°.

According to another preferred, but not strictly required, feature of the invention, in order to provide the dynamic sealing lip with flexibility, allowing replenishment with a reduced pressure differential between the upstream and downstream chambers located on either side of the sealing cup, the internal and external surfaces of the dynamic sealing lip converge on one another towards the cup's bead.

To contribute to this search for flexibility, according to another feature of the invention, the internal and external faces of the dynamic sealing lip are tapered and form with axis $\Delta$, an angle between 15° and 30°.

According to a preferred, but not strictly required, feature of the invention, in order to provide the cup with good resistance to the extrusion phenomenon resulting from frictions occurring at the dynamic sealing lip, the connecting surface between the core and the dynamic branch located opposite to the bead, is at least partly convex and corresponds to a local increase in the thicknesses of the core and the dynamic branch, defining a stiffness area.

According to another feature of the invention, in order to optimize the strength of the stiffness area, the connecting surface, located opposite the bead, between the bending area and the stiffness area, preferably but not exclusively, has at least one inflection point.

In order to optimize the differential behavior between the bending area and the stiffness area, according to another feature of the invention, the connecting surface, located opposite the bead, between the bending area and the stiffness area, has at least one inflection point.

The strength of the stiffness area is then optimized when the minimum thickness of the core, in the bending area, preferably but not necessarily, is between 45% and 80% of the maximum thickness of the core in the stiffness area and, more preferably, between 68% and 75%. The maximum thickness according to the invention is selected in accordance with the sought-after sensitivity of replenishment.

According to a preferred, but not strictly required, feature of the invention, in order to provide optimal resistance to the extrusion, the bead's surface is substantially planar and perpendicular to axis $\Delta$ of the cup on the one hand, and on the other hand, it forms a substantially right angle with the side surface of the core delimiting the stiffness area and connecting the bead to the dynamic sealing lip.

According to a preferred embodiment, the sealing cup is intended to be fitted in an annular groove provided within the cylinder, so that the static sealing lip is located outside the cup, whereas the dynamic sealing lip is located inside the cup.

However, in the sense of the invention, the cup may be fitted onto a groove of a piston, the static sealing lip would then be located on the inside of the cup whereas the dynamic sealing lip would be located on the outside of the cup.

BRIEF DESCRIPTION OF THE DRAWINGS

Various other features of the invention result from the description below, made with reference to the appended drawings, which illustrate a non-limiting embodiment of the sealing cup according to the invention.

DETAILED DESCRIPTION OF THE INVENTION

Figure 1:
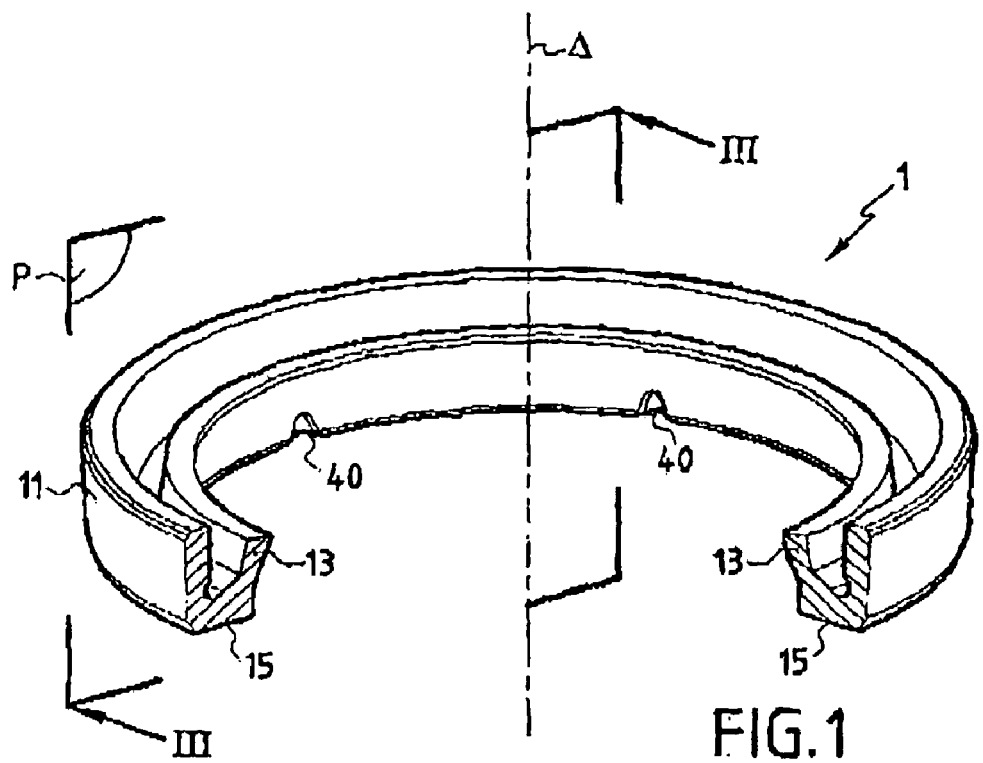
FIG. 1 is a perspective top view, partly cut-away, showing a sealing cup according to the invention.
Figure 2:
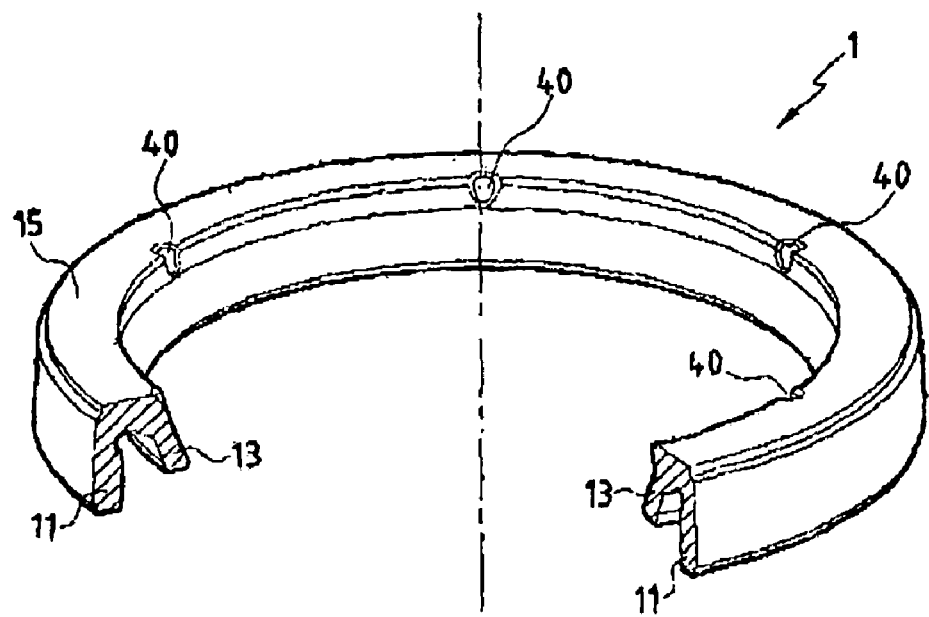
FIG. 2 is a perspective bottom view analogous to FIG. 1 of the cup.
Figure 3:
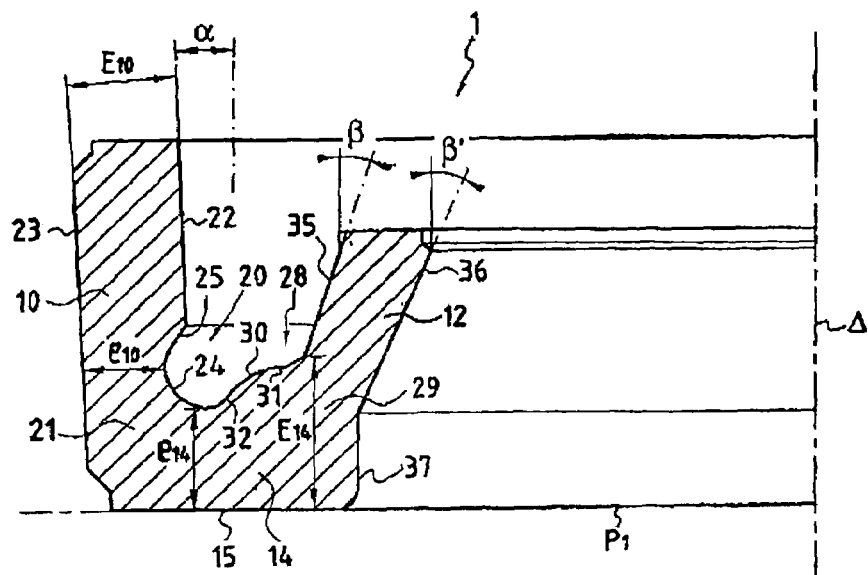
FIG. 3 is a half-axial section of the cup, as illustrated in FIGS. 1 and 2.
Figure 4:
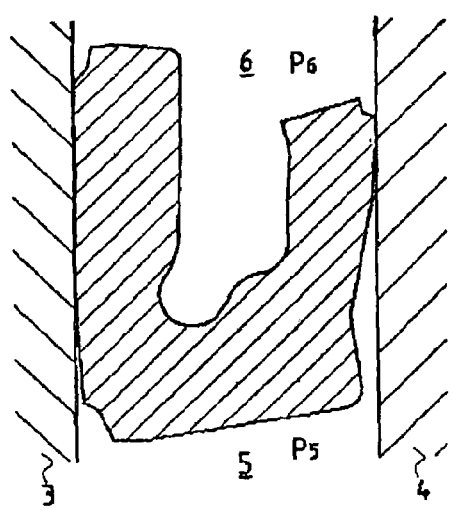
FIGS. 4 and 5 are axial sections of a cup according to the invention, in a working position.
Figure 5:
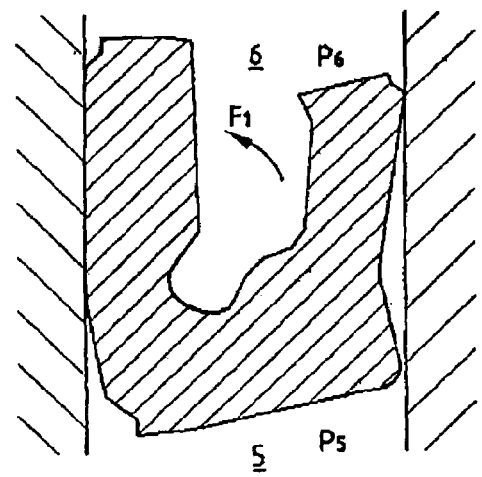

A so-called replenishment annular sealing cup according to the invention, as illustrated in FIGS. 1 to 3 and designated as a whole by reference 1, is intended to be interposed between two coaxial parts 3 and 4 as schematically illustrated in FIGS. 4 and 5 which are mobile in axial translation. Parts 3 and 4 may for example be formed by a cylinder 3 and a piston 4 of a brake control system, for example.

Now, the sealing cup 1 is for providing a replenishment or back flow stop valve function between both annular chambers 5, 6 delimited by piston 4 and cylinder 3 and separated by cup 1. Thus, cup 1 should be able to sealably isolate chambers 5 and 6 when pressure $P_6$ within the downstream chamber is greater than $P_5$, the pressure within the upstream chamber 5. On the other hand, cup 1 should allow flow of fluid from the upstream chamber 5 towards the downstream chamber 6 when pressure $P_5$ is greater than pressure $P_6$.

The difficulty in the design of cup 1, lies in determining a shape providing sufficient flexibility to the cup in order to allow replenishment of fluid from the upstream chamber 5 towards the downstream chamber, when the difference between pressures $P_5$ and $P_6$ is small, while providing sufficient strength and insulation capacity of the upstream 5 and downstream 6 chambers for maintaining large pressure differences when pressure $P_6$ is much greater than pressure $P_5$. Further, the shape of the cup 1 should allow cup 1 to withstand extrusion phenomena which may occur because of relative displacements of cylinder 3 and of piston 4.

In order to provide these functions, the sealing cup 1 has an annular general shape with axis Δ. Furthermore, the cup has, in an axial section along plane P containing the Δ axis, a <<U>> shape more particularly illustrated in FIG. 3. Thus, the axial section of cup 1 comprises a static branch 10 defining a static annular sealing lip 11 as well as a dynamic branch 12 defining a dynamic sealing lip 13, also annular. The static 10 and dynamic 11 branches are then connected to one another by a core 14, which defines an annular bead 15 opposite to lips 11 and 13.

According to the illustrated example, the dynamic sealing lip 13 is located inside cup 1, whereas the static sealing lip 11 is located outside the same cup 1. In the rest condition without any external stress, as illustrated in FIG. 3, bead 15 is substantially planar and is contained in a plan $P_1$, substantially perpendicular to axis Δ.

Cup 1 may be made out of any suitable material giving it sufficient elasticity, such as, for example, a natural or synthetic elastomer, resistant to the applied temperature and chemical conditions.

According to an essential feature of the invention, in order to give sufficient flexibility to the cup, so as to provide it with a large sensitivity to replenishment, i.e., to allow a flow of fluid from the upstream chamber 15 to the downstream chamber 6 with very little difference between pressures $P_5$ and $P_6$, the connecting area 20 between the static branch 10 and the core 14 located opposite the bead, has a concave shape corresponding to a local reduction in the thicknesses of the static branch 10 and core 14 at this connecting area, so as to define a rotation or pivoting area 21.

Preferably, the internal 22 and external 23 faces of the static sealing lip 11 or of the static branch 10 are then substantially parallel outside the rotation area 21. Thus, the connecting surface 24 between the static branch 10 and the rotation area 21 located opposite the bead 15, has at least one inflexion point 25. In order to obtain optimum bending features, while guaranteeing high stability of the static branch, the minimum thickness $e_{10}$ of the static branch 10 in the bending area, is between 60% and 85% of the maximum thickness $E_{10}$ of the static branch 10. More preferably, the minimum thickness $e_{10}$ is selected to be between 65% and 80% of thickness $E_{10}$.

In order to provide a correct geometry of the static branch upon stressing the cup 1, the internal 22 and external 23 faces of the static sealing lip form with axis Δ, an angle α between 0° and 10°.

Moreover, according to the invention, in order to provide proper resistance of cup 1 to extrusion phenomena, resulting from the relative movement of cylinder 3 and piston 4, the connecting area 28 between the core 14 and the dynamic branch 12 located opposite the bead 15, is at least partly convex and corresponds to the local increase of the thicknesses of core 14 and of the dynamic branch thereby defining a stiffness area 29.

Preferably, the connecting surface 30 between the dynamic branch 12 and the stiffness area 29, located opposite to bead 15, has at least one inflexion point 31. Also, the connecting surface located opposite bead 15 between the bending area 21 and the stiffness area 29, also has at least one inflexion point 32. Thus, the internal surface connecting the static branch 10 to the dynamic branch 12 is substantially continuous and smooth.

In order to guarantee a correct stiffness ratio, the minimum thickness $e_{14}$ of the core in the bending area 21 is between 45% and 80% of the maximum thickness $E_{14}$ of the core in the stiffness area 29. Even more preferably, thickness $E_{14}$ is selected so as to be between 68% and 75% of thickness $E_{14}$.

According to another feature of the invention, in order to give sufficient flexibility to the dynamic lip 12, the internal 35 and external 36 faces of the latter are preferably tapered and converge on one another. Further, the internal and external faces are conformed to respectively form an angle β and β' with axis Δ, angles β and β' preferably being between 15° and 30°.

Moreover, according to a preferred but not strictly required, embodiment of the invention, the surface of the bead 15 forms a substantially right angle with the side surface 37 of the core, delimiting the stiffness area 29 and connecting the bead 15 to branch 12 or to the dynamic sealing lip 13.

With the conformation of cup 1 thereby achieved, a higher performance of this cup than that of the cups according to the prior art may be obtained.

Indeed, with the cup according to the invention, perfect effectiveness in stopping cup 1 and isolating chambers 5 and 6 may be obtained when pressure $P_6$ is greater than pressure $P_5$, with a difference which may reach 260 bar under the extreme conditions of use and is between 20 bar and 60 bar under normal operating conditions.

Moreover, taking into account its configuration and its conformation, cup 1 according to the invention also provides a large sensitivity to replenishment when pressure $P_5$ is slightly greater than pressure $P_6$ allowing a flow of fluid between the upstream chamber 5 and the downstream chamber 6. In this configuration, the flexibility of area 21 forming a kind of boundary area, enables the whole formed by the stiffness area 29 and the dynamic sealing lip 13, to be displaced in the direction of the arrow $F_1$, when pressure $P_5$ is greater than pressure $P_6$ by a value less than 400 mbar. In order to promote this replenishment function, there are preferably provided, at the angle formed by the bead 15 and the side surface 37, at least one, and preferably a series of replenishment notches 40 providing for passage of the fluid, even when the bead abuts against piston 4.

Thus, with the configuration of the cup according to the invention, perfect resistance to strong pressures may be provided, while providing a large replenishment sensitivity and this with reduced overall dimensions. Indeed, with the structure provided by the invention, it is possible to make a gasket with the sought-after mechanical properties, with a transverse cross-section which is inscribed in a 4.5 mm×3 mm rectangle.

The invention is not limited to the described and illustrated example as various changes may be made thereto without departing from its scope.

The invention claimed is:

1. An annular sealing and replenishment cup with axis Δ, which is intended to be positioned between a hydraulic cylinder (3) and piston (4) and which has a <<U>> axial section comprising:
   a static branch (10) defining a static sealing annular lip (11),
   a dynamic branch (12) defining a dynamic sealing annular lip (13),
   and a core (14) connecting the static (10) and dynamic (12) branches and defining an annular bead (15) opposite the lips,
   wherein the core (14) includes a rotation area and a stiffness area, rotation area defined by a first connecting surface (24) adjacent the static branch (10), located opposite the bead (15), and having a concave shape corresponding to a local reduction in the thicknesses of the static branch (10) and of the core (14) at the connecting region between the static branch (10) and the core (14), the stiffness area having a core thickness greater than the rotation area and a second connecting surface between the first connecting surface (24) and the dynamic branch (12), the rotation area (21) allowing the dynamic branch (12) and the core (14) as a whole to be displaced relative to the static branch.

2. The sealing and replenishment cup according to claim 1, characterized in that the connecting surface (24) between the static branch (10) and the rotation area (21), located opposite the bead (15), has at least one inflexion point (25).

3. The sealing and replenishment cup according to claim 1, characterized in that the minimum thickness ($e_{10}$) of the static branch (10), in the rotation area (21), is between 60% and 85% of the maximum thickness ($E_{10}$) of the static branch (10) and preferably between 65% and 80%.

4. The sealing and replenishment cup according to claim 1, characterized in that the internal (22) and external (23) faces of the static sealing lip (11) are substantially parallel outside the bending area (21).

5. The sealing and replenishment cup according to claim 1, characterized in that the internal (22) and external (23) faces of the static lip (11) form with the Δ axis, an angle (α) between 0° and 10°.

6. The sealing and replenishment cup according to claim 1, characterized in that the internal (35) and external (36) surfaces of the dynamic sealing lip (12) converge on one another towards the bead (15) of the cup.

7. The sealing and replenishment cup according to claim 1, characterized in that the internal (35) and external (36) faces of the dynamic sealing lip (12) are tapered and form with the Δ axis, an angle (β, β') between 15° and 30°.

8. The sealing and replenishment cup according to claim 1, characterized in that the core (14) has at least one replenishment notch (40) at the connecting surface, between the bead and its side face located in the extension of the dynamic sealing lip.

9. The sealing and replenishment cup according to claim 1, characterized in that the second connecting surface is at least partly convex.

10. The sealing and replenishment cup according to claim 9, characterized in that the second connecting surface has at least one inflexion point (31) that is adjacent to the dynamic branch (12).

11. The sealing and replenishment cup according to claim 9, characterized in that the second connecting surface has at least one inflexion point (32) that is adjacent to the rotation area.

12. The sealing and replenishment cup according to claim 9, characterized in that the minimum thickness ($e_{14}$) of the core (14) in the bending area (21) is between 45% and 80% of the maximum thickness ($E_{14}$) of the core (14) in the stiffness area (29), and preferably between 68% and 75%.

13. The sealing and replenishment cup according to claim 9, characterized in that the surface of the bead (15), is substantially planar and perpendicular to axis Δ of the cup on the one hand, and on the other hand, forms a substantially right angle with the side surface (37) of the core (14) delimiting the stiffness area and connecting the bead (15) to the dynamic sealing lip (13).

14. The sealing and replenishment cup according to claim 9, characterized in that the static sealing lip (11) is located on the outside of the cup, whereas the dynamic sealing lip (13) is located on the inside of the cup.

* * * * *